US010793361B1

(12) United States Patent
Fuller et al.

(10) Patent No.: US 10,793,361 B1
(45) Date of Patent: Oct. 6, 2020

(54) COUPLING MECHANISM FOR A ROLLER CONVEYOR

(71) Applicant: INTELLIGRATED HEADQUARTERS, LLC, Mason, OH (US)

(72) Inventors: Brandon Fuller, Granite City, IL (US); Thomas Michael Ferner, Lake St. Louis, MO (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 16/558,721

(22) Filed: Sep. 3, 2019

(51) Int. Cl.
*B65G 13/11* (2006.01)
*B65G 39/12* (2006.01)

(52) U.S. Cl.
CPC .............. *B65G 13/11* (2013.01); *B65G 39/12* (2013.01)

(58) Field of Classification Search
CPC ...... B65G 39/12; B65G 39/125; B65G 39/14; B65G 39/145; B65G 39/16; B65G 39/18; B65G 13/11; B65G 13/12
USPC ....................................................... 193/35 C
See application file for complete search history.

(56) References Cited

U.S. PATENT DOCUMENTS

| 2,593,089 | A | * | 4/1952 | Barry | ...................... | B65G 39/12 |
| | | | | | | 193/35 R |
| 2,696,283 | A | * | 12/1954 | Barry | ...................... | B65G 39/12 |
| | | | | | | 193/35 R |
| 2,843,432 | A | * | 7/1958 | Kindig | ................... | B65G 21/06 |
| | | | | | | 384/419 |
| 3,252,556 | A | * | 5/1966 | Isacsson | ................ | B65G 39/12 |
| | | | | | | 193/37 |
| 4,053,039 | A | * | 10/1977 | Shuttleworth | ......... | B65G 39/12 |
| | | | | | | 193/35 R |
| 6,286,660 | B1 | | 9/2001 | Kalm | | |
| 6,302,255 | B1 | * | 10/2001 | Hollander | .............. | B65G 39/12 |
| | | | | | | 193/35 R |
| 6,666,325 | B1 | * | 12/2003 | Buenning | .............. | B65G 13/11 |
| | | | | | | 193/35 R |
| 6,799,676 | B1 | * | 10/2004 | Shipmon | ................ | B65G 39/12 |
| | | | | | | 193/35 R |
| 9,033,135 | B1 | | 5/2015 | Sharp | | |
| 2003/0209401 | A1 | * | 11/2003 | Shaw | ...................... | B65G 1/023 |
| | | | | | | 193/35 R |
| 2006/0000692 | A1 | | 1/2006 | Cotter et al. | | |
| 2007/0034488 | A1 | * | 2/2007 | Chiu Chen | ............ | B65G 13/12 |
| | | | | | | 198/861.1 |

(Continued)

FOREIGN PATENT DOCUMENTS

| CN | 105775658 B | 3/2018 | |
| EP | 2451730 B1 | 3/2014 | |
| WO | WO-0046133 A1 * | 8/2000 | ............. B65G 13/11 |

*Primary Examiner* — Mark A Deuble
(74) *Attorney, Agent, or Firm* — Alston & Bird LLP

(57) ABSTRACT

A coupling mechanism includes a pair of bracket and a spacer plate sandwiched in between the pair of brackets. Each bracket of the of brackets comprise a first cutout formed on a top face of each bracket of the brackets. A retainer bar coupled to the pair of brackets, wherein the retainer bar comprises a second cutout formed on a bottom face of the retainer bar and a flat top surface. The second cutout and the first cutout abut each other to form an opening, wherein the opening receives an axle of a conveyor roller.

20 Claims, 5 Drawing Sheets

(56) References Cited

U.S. PATENT DOCUMENTS

2009/0250322 A1\* 10/2009 Jager ..................... B65G 21/06
198/835
2017/0247196 A1\* 8/2017 Summerell ............ E21F 13/02

\* cited by examiner

COUPLING MECHANISM FOR A ROLLER CONVEYOR

TECHNOLOGICAL FIELD

The present disclosure relates generally to a coupling mechanism, and, more particularly, to a coupling mechanism used in conjunction with a roller conveyor.

BACKGROUND

Generally, conveyors are a part of material handling systems capable of transporting goods from one location to another location in a warehouse environment. These conveyors may fall under broad categories such roller conveyors or belt conveyors. These conveyors are often divided into several zones with each zone operating independently or collaboratively to transport the goods in a desired fashion.

SUMMARY

The following presents a simplified summary to provide a basic understanding of some aspects of the disclosed material handling system. This summary is not an extensive overview and is intended to neither identify key or critical elements nor delineate the scope of such elements. Its purpose is to present some concepts of the described features in a simplified form as a prelude to the more detailed description that is presented later.

Various example embodiments described herein, relates to a coupling mechanism. The coupling mechanism includes a pair of bracket and a spacer plate sandwiched in between the pair of brackets. Each bracket of the of brackets comprise a first cutout formed on a top face of each bracket of the brackets. A retainer bar coupled to the brackets, wherein the retainer bar comprises a second cutout formed on a bottom face of the retainer bar and a flat top surface. The second cutout and the first cutout abut each other to form an opening, wherein the opening receives an axle of a conveyor roller.

The coupling mechanism of claim 1, wherein the retainer bar is coupled to the pair of brackets with a T-shaped nut provided at the bottom face of the retainer bar, wherein the T-shaped nut and the retainer bar is coupled using a threaded bolt.

Various example embodiments described herein, relates to a coupling mechanism in which a height of the retainer bar from the top face to the bottom face is substantially equal to a height of the threaded bolt inserted from top of the retainer bar.

Various example embodiments described herein, relates to a coupling mechanism in which the T-shaped nut comprises a female threaded portion that engages with a male threaded portion of the threaded bolt.

Various example embodiments described herein, relates to a coupling mechanism in which the T-shaped nut connects the retainer bar with the pair of brackets.

Various example embodiments described herein, relates to a coupling mechanism in which the spacer plate is sandwiched in between the pair of brackets using a set of fastener, and wherein the pair of brackets and the spacer plate comprise a set of apertures to receive the set of fastener.

Various example embodiments described herein, relates to a coupling mechanism in which the spacer plate is sandwiched in between the pair of brackets using the T-shaped nut.

Various example embodiments described herein, relates to a coupling mechanism in which the pair of brackets further comprises a rectangular slot to receive the T-shaped nut and couple with the spacer plate and the retainer bar.

Various example embodiments described herein, relates to a coupling mechanism in which the pair of brackets, the spacer plate and the retainer bar are coupled using the T-shaped nut Various example embodiments described herein, relates to a coupling mechanism in which the brackets comprise a plurality of rectangular slots that are placed equidistant from each other through a length of each bracket in between first cutouts on each of the brackets.

Various example embodiments described herein, relates to a coupling mechanism in which the opening is formed in between the pair of brackets and the retainer bar when the bottom face of the retainer bar couples to the top face of the pair of brackets.

Various example embodiments described herein, relates to a coupling mechanism in which the second cutout is press fitted from a top of the axle to abut with the first cutout such that the movement of the axle is restricted within the opening.

Various example embodiments described herein, relates to a coupling mechanism in which the brackets comprise a first plurality of cutouts that are positioned at a first predetermined distance from each other throughout a length of the brackets.

Various example embodiments described herein, relates to a coupling mechanism in which the retainer bar comprises a second plurality of cutouts that are positioned at a second predetermined distance from each other throughout a length of the retainer bar, wherein the first predetermined distance and the second predetermined distance are made equal such that the first plurality of cutouts mates with respective ones of the second plurality of cutouts.

Various example embodiments described herein, relates to a conveyor system having a conveyor frame with a coupling mechanism. The conveyor frame includes a first roller and a second roller coupled to the conveyor frame. The coupling mechanism to couple the first roller with the second roller. The coupling mechanism includes a pair of brackets and a spacer plate sandwiched in between the pair of brackets. Each bracket of the of brackets comprise a first cutout formed on a top face of each bracket of the brackets. A retainer bar coupled to the spacer plate, wherein the retainer bar comprises a second cutout formed on a bottom face of the retainer bar and a flat top surface. The second cutout and the first cutout abut each other to form an opening, wherein the opening receives a first axle from the first roller, and a second axle from the second roller.

Various example embodiments described herein, relates to a conveyor system having a conveyor frame with a coupling mechanism in which the pair of brackets is coupled to the retainer bar using T-shaped nuts.

Various example embodiments described herein, relates to a conveyor system having a conveyor frame with a coupling mechanism in which the second cutout is press fitted on top of one end of the first axle of the first roller and the second axle of the second roller to abut with the first cutout such that the movement of the first axle and the second axle is restricted within the opening.

Various example embodiments described herein, relates to a conveyor system having a conveyor frame with a coupling mechanism in which the pair of brackets comprise a first plurality of cutouts that are positioned at a first predetermined distance from each other throughout a length of the brackets.

Various example embodiments described herein, relates to a conveyor system having a conveyor frame with a coupling mechanism in which the retainer bar comprises a second plurality of cutouts that are positioned at a second predetermined distance from each other throughout a length of the retainer bar, wherein the first predetermined distance and the second predetermined distance are made equal such that the first plurality of cutouts mates with respective ones of the second plurality of cutouts.

Various example embodiments described herein, relates to a conveyor system having a conveyor frame with a coupling mechanism in which the opening is formed in between the pair of brackets and the retainer bar when the bottom face of the retainer bar couples to the top face of the pair of brackets.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
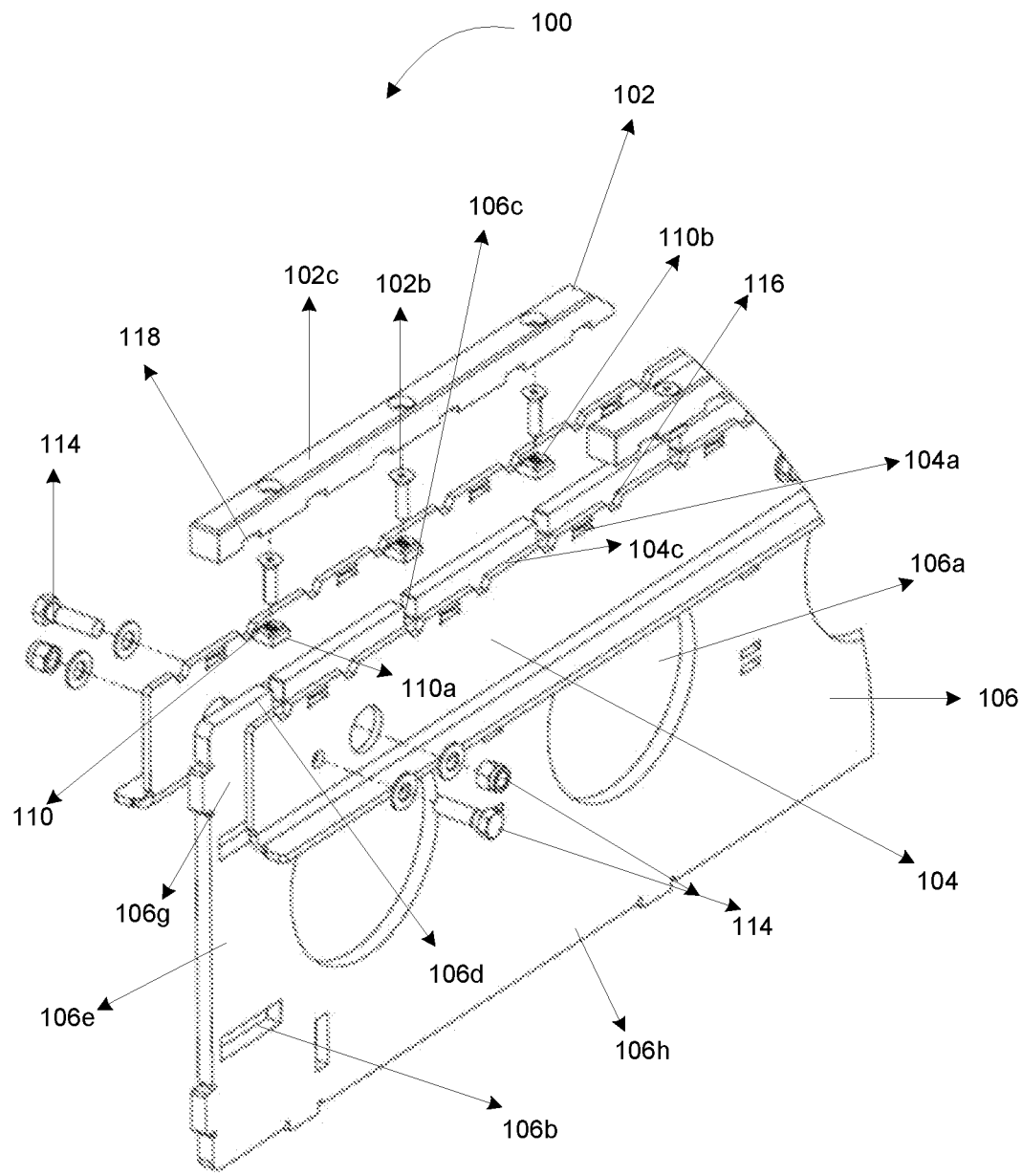
FIG. 1 illustrates a perspective exploded view of a coupling mechanism used in material handling systems, in accordance with an embodiment of the present disclosure.

Some embodiments of the present disclosure will now be described more fully hereinafter with reference to the accompanying drawings, in which some, but not all embodiments are shown. Indeed, the concepts described here may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the disclosure described herein such that embodiments may comprise fewer or more components than those shown in the figures while not departing from the scope of the disclosure.

The term "coupling mechanism" may refer to a coupling unit with one or more mechanical components used for coupling one or more individual mechanical parts of a material handling system. More specifically, coupling one or more conveyor parts of a conveyor system.

The term "conveyor" or "conveyor zone" or "conveyor system" or "conveyor bed" may be used interchangeably throughout the specification.

Further, the term "conveyor rollers" or "rollers" may be used interchangeably throughout the specification.

Turning now to the drawings, the detailed description set forth below in connection with the appended drawings is intended as a description of various configurations and is not intended to represent the only configurations in which the concepts described herein may be practiced. The detailed description comprises specific details for the purpose of providing a thorough understanding of various concepts with like numerals denote like components throughout the several views. However, it will be apparent to those skilled in the art that these concepts may be practiced without these specific details.

Generally coupling mechanisms can include multiple mechanical components attached to each other using fasteners. These mechanical components may be positioned at various locations on a conveyor frame. Often, these mechanical components may be positioned at a location that may be hard to service during normal operation of a conveyor. For example, an operator will dismantle one or more conveyor parts, such as a roller, drive belt, and the like, from the conveyor frame in order to service the mechanical components of the coupling mechanism. In certain cases, some of the mechanical components may not be serviceable due to the location of these mechanical components in the conveyor frame. For example, a screw which may be inserted into a threaded hole positioned at a location difficult to reach by the operator. In this regard, one or more of the mechanical components of the coupling mechanism can remain unserviceable over a period of time which may lead to rusting of these mechanical components, thereby reducing the life of the conveyors. In certain cases, one or more of the mechanical components may be coupled in such a manner that the operator uses special tools and additional time or effort to remove them.

In certain scenarios, when the coupling mechanism is used specifically for coupling one or more conveyor parts, such as rollers, the conveyors may not be able to effectively guide articles travelling on the conveyors in a desired path. For example, a singulation conveyor or a side by side reducer conveyor or a case turner conveyor may include multiple zones with rollers arranged parallel to each other in a skewed or non-skewed manner. In such a parallel arrangement, rollers of two zones can be coupled together to achieve the parallel arrangement. The coupling mechanism may be used to couple the rollers of the two zones. However, when coupling the two zones with the coupling mechanism, gaps may be introduced between the coupled zones. The articles travelling on these zones or the articles transiting from one zone to other zone may be trapped in between these gaps. For example, if the article is a mail piece, the article may be caught in between these gaps leading to shutdown of the conveyor system. For example, if the article is a poly bag, the article may be caught in the gaps or stuck in the mechanical components of the coupling mechanism leading to the shutdown of the conveyor system. When the articles are caught in between two zones it may be laborious to retrieve these articles and may increase downtime of the conveyor system.

Various example embodiments described herein relates to a coupling mechanism which is easy to access and requires less maintenance than traditional coupling techniques. The coupling mechanism includes a pair of brackets and a spacer plate sandwiched in between the pair of brackets. Each bracket of the of brackets can include a first cutout formed on a top face of each bracket of the brackets. A retainer bar is coupled to the pair of brackets. And the retainer bar can have a second cutout formed on a bottom face of the retainer bar and a flat top surface. The second cutout and the first cutout can abut each other, or be aligned with each other in order to form an opening, where the opening receives an axle of a conveyor roller.

According to some example embodiments, the spacer plate is sandwiched in between the pair of brackets using the T-shaped nut.

According to some example embodiments, the retainer bar is coupled to the pair of brackets with a T-shaped nut provided at the bottom face of the retainer bar, wherein the T-shaped nut and the retainer bar is coupled using a threaded bolt.

According to some example embodiments, the opening can be formed in between the pair of brackets and the retainer bar when the bottom face of the retainer bar couples to the top face of the pair of brackets.

According to some example embodiments, the second cutout is press fitted from a top of the axle to abut with the first cutout such that the movement of the axle is restricted within the opening.

In the following detailed description of exemplary embodiments of the disclosure, specific representative embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

FIG. 1 illustrates a perspective exploded view of a coupling mechanism used in material handling systems, in accordance with an embodiment of the present disclosure. The coupling mechanism 100 includes a retainer bar 102, a pair of brackets 104, and a spacer plate 106.

Figure 2:
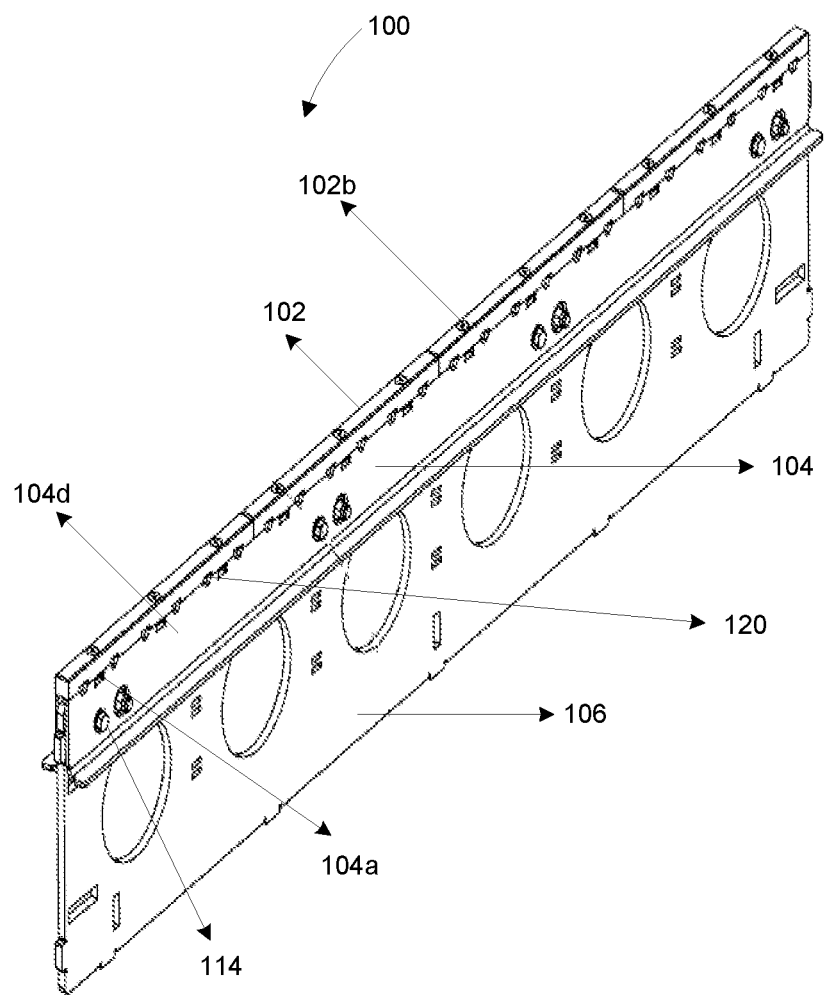
FIG. 2 illustrates a perspective assembled view of a coupling mechanism in accordance with an embodiment of the present disclosure.

The spacer plate 106 is sandwiched in between the pair of brackets 104. According to an embodiment, the spacer plate 106 includes cutout holes 106a and cutout slots 106b of varying dimensions. For example, the cutout holes 106a may be provided to reduce a weight of the spacer plate 106 based on a conveyor system in which it is to be used and the cutout slots 106b are provided to accommodate wires or cables used in the conveyor system. According to another embodiment, the spacer plate 106 may be a flat plate of varying thickness and dimensions devoid of cutout holes 106a and cutout slots 106b. The spacer plate 106 may be vertically positioned and sandwiched between the pair of brackets 104. According to an embodiment, the spacer plate 106 can include openings 106c provided on a top face 106d of the spacer plate 106 when held in the vertical position in between the pair of brackets 104. These openings 106c, for example, may be longitudinally or vertically extending openings opposite to the openings 201 as shown in FIG. 2. These openings 106c may be positioned equidistant from each other throughout a length of the spacer plate 106. Each of the longitudinally or vertically extending openings 106c may receive a T-shaped nut 110. For example, a bottom portion of the T-shaped nut 110 may abut the top face of the spacer plate 106. In some examples, the T-shaped nut 110 be press fitted into the longitudinally or vertically extending openings 106c without the use of any fastener. In one or more example embodiments, the spacer plate 106 may be devoid of the longitudinally or vertically extending openings 106c.

The T-shaped nut 110 can include integrally formed lateral protrusions 110a on both side faces of the T-shaped nut 110. The lateral protrusions 110a can be used to couple the pair of brackets 104 with the retainer bar 102. The T-shaped nut 110 can include a threaded portion 110b on a top face to receive a threaded bolt 102b to couple with the retainer bar 102. The lateral protrusions 110a of the T-shaped nut 110 extend laterally beyond the retainer bar 102 when the retainer bar 102 is coupled with the brackets 104.

The pair of brackets 104 are coupled on both side faces 106e, 106f (not shown) of the spacer plate 106. According to an embodiment, the pair of brackets 104, may be L-shaped brackets coupled to a top portion 106g of the side faces 106e, 106f of the spacer plate 106 and a bottom portion 106h may be connected to a conveyor frame. Each of the brackets 104 can include rectangular slots 104a. The rectangular slots 104a may be positioned equidistant from each other throughout a length of the bracket 104. In other embodiments, different placement patters of the rectangular slots 104a is possible. Each lateral protrusion 110a of the T-shaped nut 110 can be secured inside each rectangular slot 104a of the bracket 104 to clamp each bracket 104 with the spacer plate 106. In some example, the lateral protrusion 110a can be press fitted inside the rectangular slots 104a without the use of any fasteners. In one or more embodiments, a dimension of the lateral protrusion 110a can be substantially equal to the dimension of the rectangular slots 104a. According to an embodiment, the brackets 104 may include a set of apertures 104b to receive a set of fasteners 114 used for coupling the brackets 104 with the spacer plate 106. The set of fasteners 114 may include threaded bolts, threaded nuts, washers, screws, and their combination. In the example embodiment of FIG. 1, a bolt and nut combination with washers are shown to couple the brackets 104 with the spacer plate 106. The set of fasteners 114 may be provided in addition to the T-shaped nuts 110 to couple the brackets 104 with the spacer plate 106. In some examples, the T-shaped nuts 110 may be used to couple the brackets 104 with the spacer plate 106 without the use of any fasteners. Further, the pair of brackets 104 can include first cutouts 116 formed on the brackets 104. For example, the first cutouts 116 can be semi-hexagonal cutouts integrally formed on a top face 104c of the brackets 104. For example, the rectangular slots 104a may be placed equidistant from each other throughout a length of each bracket in between two semi-hexagonal cutouts 116 on each of the brackets 104. The first cutouts 116 may be positioned at a predetermined distance from each other throughout a length of each bracket 104. According to an embodiment, each first cutout 116 is capable of receiving a conveyor part, for example, an axle of a conveyor roller. In other embodiments, the cutouts 116 can be in shapes other than a semi-hexagonal shape.

The retainer bar 102 is coupled to the brackets 104 using the T-shaped nuts 110. According to an embodiment, the retainer bar 102 includes holes 102a on a top face 102c of the retainer bar 102 to receive threaded bolts 102b. These threaded bolts 102b are inserted from the top face 102c of the retainer bar 102. The threaded bolts 102b can engage with the T-shaped nuts 110 to couple the retainer bar 102 with the T-shaped nuts 110. As discussed previously, the threaded portion 110b on the top face of the T-shaped nuts 110 receive the threaded bolts 102b. For example, male threaded portion of the threaded bolts 102b engages with female threaded portion 110b of the T-shaped nuts 110. In some examples, a height of the retainer bar 102 from the top face 102c to a bottom face 102d (not shown) is substantially equal to a height of the threaded bolt 102b inserted from the top face 102c of the retainer bar 102. According to an embodiment, the retainer bar 102 includes second cutouts 118 formed on the retainer bar 102. For example, the second cutouts 118 are semi-rectangular cut outs integrally formed on the bottom face 102d of the retainer bar 102. The second cutouts 118 may be positioned at a predetermined distance from each other throughout a length of the retainer bar 102. The second cutouts 118 may be dimensioned to be substantially equal to the dimension of the first cutouts 116. For example, a depth and width of both the cutouts 116, 118 may be substantially equal. According to an embodiment, it is conceivable to provide other shapes of cutouts 116, 118 such as but not limited to, semi-square, semi-circular, semi-triangular, semi-polygon, or any other like shapes which can hold the conveyor parts firmly without any jerks during operation. According to an embodiment, the second cutouts 118 abut the first cutouts 116 to form openings as shown in FIG. 2 when the retainer bar 102 is coupled with the pair of brackets 104.

FIG. 2 illustrates a perspective assembled view of the coupling mechanism 100 of FIG. 1, in accordance with an embodiment of the present disclosure. In the FIG. 2, the retainer bar 102, the spacer plate 106 and the pair of brackets 104 are coupled to each other using T-shaped nuts 110 and other fasteners 114 as discussed previously. In the FIG. 2, the first cutouts 116 abut the second cutouts 118 when the T-shaped nuts 110 are secured inside the rectangular slots of the brackets 104. For example, when both the first cutout 116 and the second cutout 118 meet each other, an opening 120 is formed. In some examples, the opening 120 may be laterally extending in the X axis. In some example, the opening 120 appears to be formed on an outer face 104d of the brackets 104 when the bottom face 102d of the retainer bar 102 couples with the top face of the brackets 104. The brackets 104 are coupled to the spacer plate 106 using the T-shaped nuts 110. The laterally extending portion 110a of the T-shaped nut 110 are press fitted into the rectangular slots 104a of the brackets 104 to couple with the spacer plate 106. In addition, one or more fasteners 114 may be used to couple the brackets 104 and the spacer plate 106. For example, one end of a bolt may be inserted through an aperture 104b of one bracket 104 and the other end of the bolt may pass through another aperture 104b provided on the other bracket 104 and tightened with a nut and washer as shown in FIG. 1. Further, the retainer bar 102 is coupled to the brackets 104 using the T-shaped nut 110 and the threaded bolt 102b. For example, male threaded potion of the threaded bolt 102b is screwed into the female threaded portion 110b of the T-shaped nut 110 to couple the retainer bar 102 with the brackets 104. When the retainer bar 102 and the brackets 104 are coupled, the second cutout 118 of retainer bar 102 mates with the first cutout 116 of each bracket 104 to form the openings 120. In some examples, these openings 120 may receive conveyor parts, such as but not limited to a conveyor roller axle as shown in FIG. 3.

Figure 3:
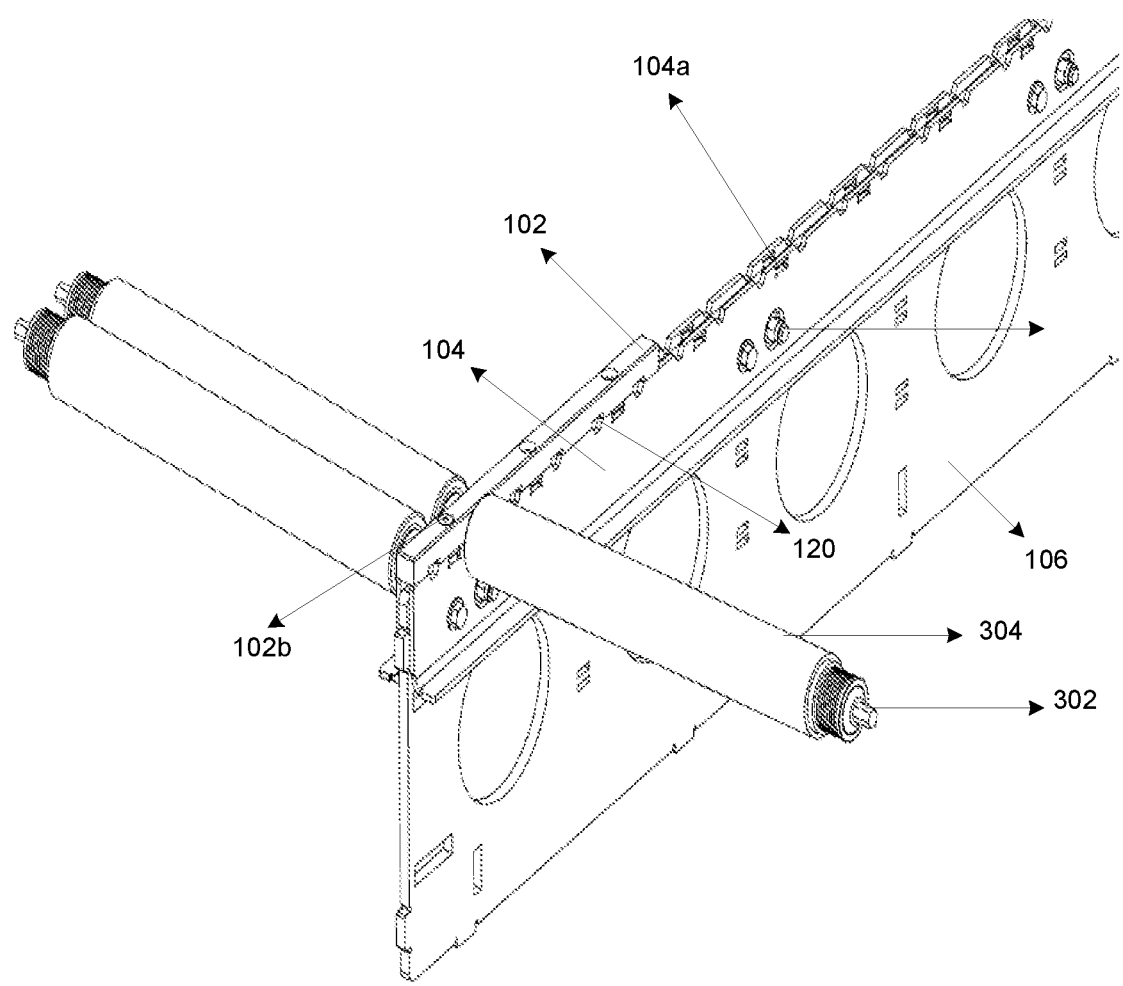
FIG. 3 illustrates a perspective assembled view of a coupling mechanism with conveyor rollers coupled to the coupling mechanism, in accordance with an embodiment of the present disclosure.

FIG. 3 illustrates a perspective assembled view of a coupling mechanism 100 of FIG. 1 with conveyor rollers coupled to the coupling mechanism, in accordance with an embodiment of the present disclosure. According to an embodiment, the openings 120 formed by the abutment of the first cutout 116 and the second cutout 118 receives the conveyor roller axles 302. In some examples, the conveyor roller axles 302 may be hexagonally shaped. For example, after the components of the coupling mechanism 100 are assembled together, the conveyor roller axles 302 are inserted in a lateral direction opposite to a transportation direction into the openings 120. In some examples, the conveyor roller axle 302 is press fitted into the openings 120 such that conveyor roller 304 does not vibrate or jerk during their operation. According to another embodiment, the conveyor roller axles 302 are placed on the first cutouts 116 on the brackets 104 and then the second cutouts 118 of retainer bar 102 are placed on top of the conveyor roller axles 302 and fastened in such a manner to mate the second cutouts 118 with the first cutouts 116. For example, at first, the brackets 104 are fastened to the T-shaped nut 110 and the conveyor roller axle 302 is placed on the first cutout 116 and then the retainer bar 102 is fastened to the T-shaped nut 110 such that the second cutout 118 press fitted against the conveyor roller axle 302 to form the opening 120 by abutting with the first cutout 116 and retaining the conveyor roller axle 302 inside the opening 120. Such press fitting is performed such that the conveyor roller axles 302 does not vibrate or jerk during their operation. The coupling mechanism 100 may be installed in a single conveyor frame 410 with multiple conveyor rollers 304 as shown in FIG. 4 and coupled in a manner discussed previously.

Figure 4:
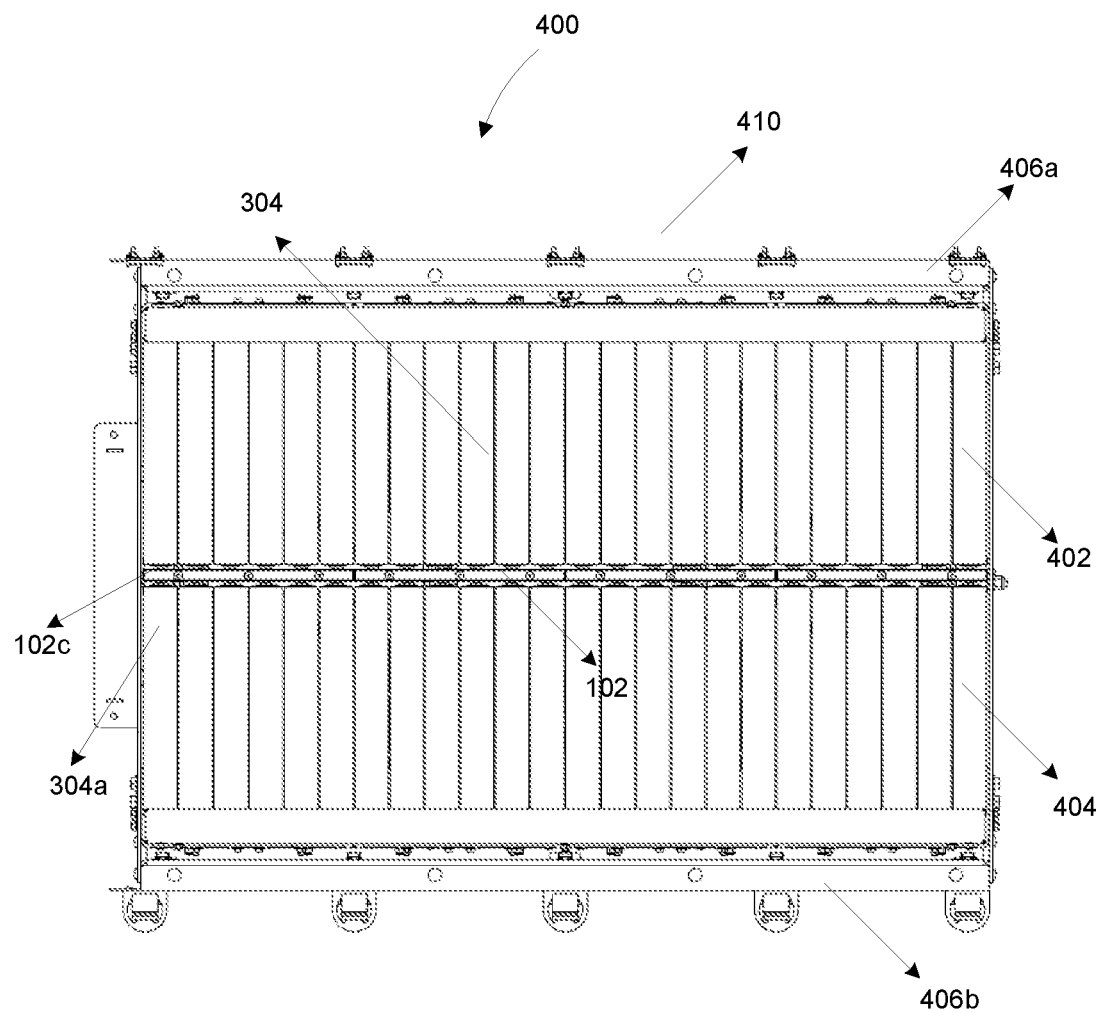
FIG. 4 illustrates a top view of a conveyor system with conveyor rollers coupled to a conveyor frame and the coupling mechanism, in accordance with an embodiment of the present disclosure.
Figure 5:
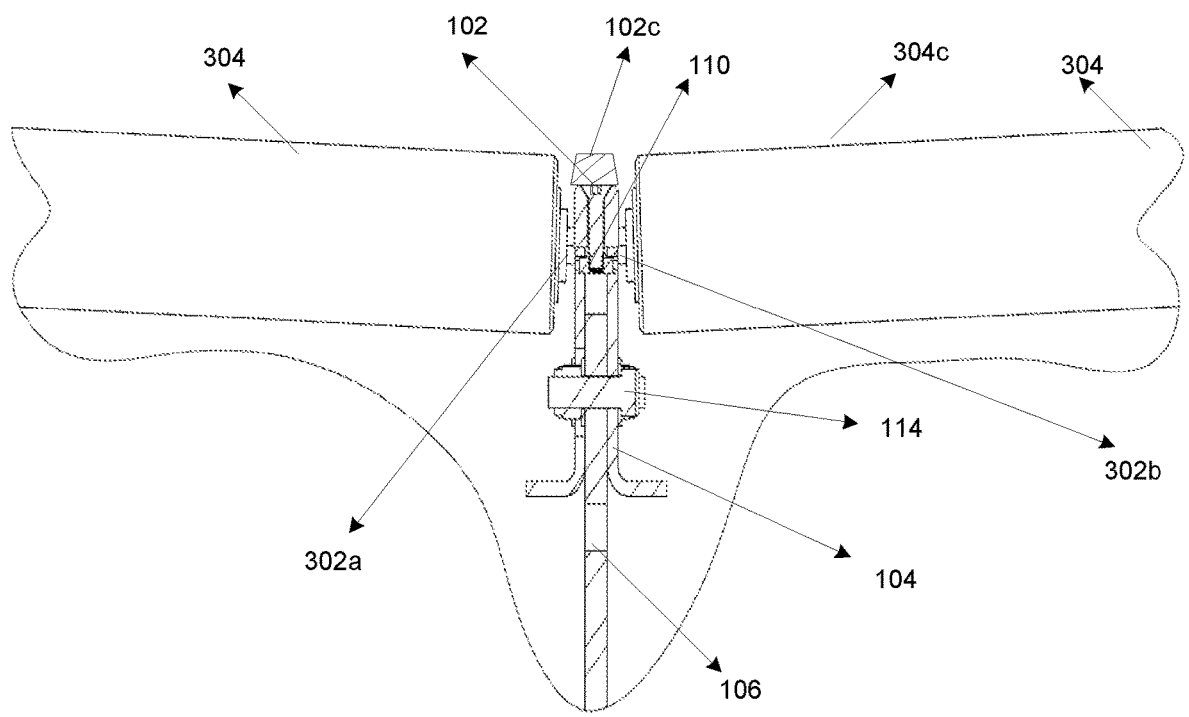
FIG. 5 illustrates a front view of a conveyor system with conveyor rollers coupled to the conveyor frame and a coupling mechanism, in accordance with an embodiment of the present disclosure.

FIG. 4 illustrates a top view of a conveyor system 400 with the conveyor rollers 304 coupled to the conveyor frame 410 and the coupling mechanism 100, in accordance with an embodiment of the present disclosure. The conveyor system 400 includes multiple conveyor rollers 304 arranged in a side by side configuration. For example, the conveyor system 400 as shown in the FIG. 4 may be a singulation conveyor system or a case turner conveyor system having multiple conveyor zones. Each conveyor zone may have a set of conveyor rollers 304 operating at different speeds and skewed at various angles. For example, a first conveyor zone 402 may include a first set of roller that may be skewed and operating at a first speed and a second conveyor zone 404 may include a second set of rollers that may be non-skewed and operating at a second speed. The first conveyor zone 402 and the second conveyor zone 404 may be coupled to single conveyor frame 410 in a side by side configuration. For example, the conveyor frame 410 may include side rails that connect to both the first conveyor zone 402 and the second conveyor zone 404. For example, a first side rail 406a may receive the conveyor roller axles 302 of the first conveyor zone 402 and a second side rail 406b may receive the conveyor roller axles 302 of the second conveyor zone 404. In some examples, the first conveyor zone 402 and the second conveyor zone 404 may be further segregated into multiple conveyor zones. As shown in the FIG. 4, one end of the conveyor roller axles 302 of both the conveyor zones is connected to the side rails 406a, 406b and the other end of the conveyor roller axles 302 of both the conveyor zones is connected to the coupling mechanism 100 of FIG. 1. According to an embodiment, the coupling mechanism 100 may be positioned at a center of the conveyor system 400 to connect or couple both the conveyor zones 402, 404, however, conceivable are other arrangements in which the coupling mechanism 100 is positioned at other positions, such as, but not limited to, angled towards the first rail 406a or angled toward the second rail 406b or substantially nearer to the first rail 406a and angled towards the center or substantially nearer to the second rail 406b and angled towards the center or their combinations. Further, the retainer bar 102 of the coupling mechanism 100 in the assembled view as shown in FIG. 2 remains in parallel with the conveyor rollers 304. For example, a top face 304a of the conveyor roller 304 in the installed position on the conveyor frame 410 and a top face 102c of the retainer bar 102 in the assembled position exists in the same plane at a same height to provide an even uniform surface for articles travelling on the conveyor zones 402, 404. Further, the retainer bar 102 acts like a cover to fill a gap existing between the two conveyor zones 402, 404, thereby, the articles travelling on the conveyor zones 402, 404 may not be stuck in the gap when transiting from the first conveyor zone 402 to the second conveyor zone 404 or vice versa. Therefore, the coupling mechanism 100 facilitates the conveyor system 400 to be well suited for transporting articles such as polybags or mails. In FIG. 5, it is clearly seen that the retainer bar 102 and the conveyor rollers 304 are in the same plane and in the same height to provide a smooth surface for the articles to be transported. In the FIG. 5, it is seen that the front face and side faces of the retainer bar 102, the brackets 104, and the spacer plate 106 appears to be in the same plane with minimal or no protrusions or projections or fasteners, specifically between the conveyor rollers 304 of both the conveyor zones 402, 404. Such an arrangement provides an operator to service the conveyor rollers 304 and the coupling mechanism 100 at ease without pinching his fingers against any projection of any mechanical components when removing or re-inserting the conveyor rollers. Further, the retainer bar 102 and the brackets 104 can be easily detached from each other and also from the spacer plate 106 for servicing since these components are connected to one T-shaped nut 110. Further, the conveyor roller axles 302, the retainer bar 102, and the brackets 104 are coupled to each other by interference or press fit with minimal use of fasteners, which reduces the possibility of a rust over a period of time and increase the life of the conveyor system. Further, as shown in FIG. 5, one end of a first axle 302a of a conveyor roller form the first conveyor zone 402 and one end of a second axle 302b of a conveyor roller from the second conveyor zone 404 are press fitted into the opening 120 of the coupling mechanism 100 as discussed previously. In some examples, the first axle 302a and the second axle 302b may be placed on the first cutout 116 respectively and then the second cutout 118 is press fitted on top of one end of the first axle 302a and the second axle 302b to abut with the first cutout 116 such that the movement of the first axle 302a and the second axle 302b is restricted within the opening 120. Such arrangements may hold the axles firmly without any jerks during operation.

The foregoing description of an embodiment has been presented for purposes of illustration and description. It is not intended to be exhaustive or to limit the disclosure to the precise form disclosed. Obvious modifications or variations are possible in light of the above teachings. The embodiment was chosen and described in order to best illustrate the principles of the disclosure and its practical application to thereby enable one of ordinary skill in the art to best utilize the disclosure in various embodiments and with various modifications as are suited to the particular use contemplated. Although only a limited number of embodiments of the disclosure are explained in detail, it is to be understood that the disclosure is not limited in its scope to the details of construction and arrangement of components set forth in the preceding description or illustrated in the drawings. The disclosure is capable of other embodiments and of being practiced or carried out in various ways. Also, in describing the embodiment, specific terminology was used for the sake of clarity. It is to be understood that each specific term comprises all technical equivalents which operate in a similar manner to accomplish a similar purpose.

The invention claimed is:

1. A coupling mechanism comprising:
   a pair of brackets;
   a spacer plate sandwiched in between the pair of brackets, wherein each bracket of the pair of brackets comprise a first cutout formed on a top face of each bracket of the pair of brackets; and
   a retainer bar coupled to the pair of brackets, wherein the retainer bar comprises a second cutout formed on a bottom face of the retainer bar and a flat top surface; and
   wherein the second cutout and the first cutout abut each other to form an opening, wherein the opening receives an axle of a conveyor roller.

2. The coupling mechanism of claim 1, wherein the retainer bar is coupled to the pair of brackets with a T-shaped nut provided at the bottom face of the retainer bar, wherein the T-shaped nut and the retainer bar is coupled using a threaded bolt.

3. The coupling mechanism of claim 2, wherein a height of the retainer bar from a top face to the bottom face is substantially equal to a height of the threaded bolt inserted from a top of the retainer bar.

4. The coupling mechanism of claim 2, wherein the T-shaped nut comprises a female threaded portion that engages with a male threaded portion of the threaded bolt.

5. The coupling mechanism of claim 2, wherein the T-shaped nut connects the retainer bar with the pair of brackets.

6. The coupling mechanism of claim 1, wherein the spacer plate is sandwiched in between the pair of brackets using a set of fastener, and wherein the pair of brackets and the spacer plate comprise a set of apertures to receive the set of fastener.

7. The coupling mechanism of claim 2, wherein the spacer plate is sandwiched in between the pair of brackets using the T-shaped nut.

8. The coupling mechanism of claim 7, wherein the pair of brackets further comprise a rectangular slot to receive the T-shaped nut and couple the pair of brackets with the retainer bar.

9. The coupling mechanism of claim 2, wherein the pair of brackets, the spacer plate and the retainer bar are coupled using the T-shaped nut.

10. The coupling mechanism of claim 8, wherein the pair of brackets comprise a plurality of rectangular slots that are placed equidistant from each other through a length of each bracket in between the first cutouts on each of the pair of brackets.

11. The coupling mechanism of claim 1, wherein the opening is formed in between the pair of brackets and the retainer bar when the bottom face of the retainer bar couples to the top face of the pair of brackets.

12. The coupling mechanism of claim 1, wherein the second cutout is press fitted from a top of the axle to abut with the first cutout such that the movement of the axle is restricted within the opening.

13. The coupling mechanism of claim 1, wherein brackets comprise a first plurality of cutouts that are positioned at a first predetermined distance from each other throughout a length of the brackets.

14. The coupling mechanism of claim 13, wherein the retainer bar comprises a second plurality of cutouts that are positioned at a second predetermined distance from each other throughout a length of the retainer bar, wherein the first predetermined distance and the second predetermined distance are made equal such that the first plurality of cutouts mates with respective ones of the second plurality of cutouts.

15. A conveyor system comprising:
a conveyor frame;
a first roller and a second roller coupled to the conveyor frame;
a coupling mechanism to couple the first roller with the second roller, the coupling mechanism comprises:
a pair of brackets;
a spacer plate sandwiched in between the pair of brackets, wherein each bracket of the pair of brackets comprise a first cutout formed on a top face of each bracket of the pair of brackets; and
a retainer bar coupled to the pair of brackets, wherein the retainer bar comprises a second cutout formed on a bottom face of the retainer bar and a flat top surface; and
wherein the second cutout and the first cutout abut each other to form an opening, wherein the opening receives a first axle from the first roller, and a second axle from the second roller.

16. The conveyor system of claim 15, wherein the pair of brackets is coupled to the retainer bar using T-shaped nuts.

17. The conveyor system of claim 15, wherein the second cutout is press fitted on top of one end of the first axle of the first roller and the second axle of the second roller to abut with the first cutout such that the movements of the first axle and the second axle are restricted within the opening.

18. The conveyor system of claim 15, wherein the pair of brackets comprise a first plurality of cutouts, wherein cutouts of the first plurality of cutouts are positioned at a first predetermined distance from each other throughout a length of the pair of brackets.

19. The conveyor system of claim 18, wherein the retainer bar comprises a second plurality of cutouts, wherein cutouts of the second plurality of cutouts are positioned at a second predetermined distance from each other throughout a length of the retainer bar, wherein the first predetermined distance and the second predetermined distance are made equal such that the first plurality of cutouts mates with respective ones of the second plurality of cutouts.

20. The conveyor system of claim 15, wherein the opening is formed in between the pair of brackets and the retainer bar when the bottom face of the retainer bar couples to the top face of each bracket of the pair of brackets.

* * * * *